(12) United States Patent
Gove

(10) Patent No.: US 9,009,447 B2
(45) Date of Patent: Apr. 14, 2015

(54) ACCELERATION OF STRING COMPARISONS USING VECTOR INSTRUCTIONS

(75) Inventor: Darryl J. Gove, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 893 days.

(21) Appl. No.: 13/185,244

(22) Filed: Jul. 18, 2011

(65) Prior Publication Data

US 2013/0024653 A1 Jan. 24, 2013

(51) Int. Cl.
  *G06F 9/30* (2006.01)
(52) U.S. Cl.
  CPC ........ *G06F 9/30036* (2013.01); *G06F 9/30018* (2013.01); *G06F 9/30021* (2013.01)
(58) Field of Classification Search
  CPC combination set(s) only.
  See application file for complete search history.

(56) References Cited

U.S. PATENT DOCUMENTS

| | | | |
|---|---|---|---|
| 6,122,725 A | 9/2000 | Roussel | |
| 6,145,072 A | 11/2000 | Shams | |
| 6,175,892 B1 | 1/2001 | Sazzad | |
| 7,782,844 B1* | 8/2010 | Smith | 370/389 |
| 2008/0077773 A1* | 3/2008 | Julier et al. | 712/210 |
| 2009/0210467 A1* | 8/2009 | Iorio | 708/204 |

* cited by examiner

*Primary Examiner* — Eric Coleman
(74) *Attorney, Agent, or Firm* — Rory D. Rankin; Meyertons, Hood, Kivlin, Kowert & Goetzel, P.C.

(57) ABSTRACT

A processor, method, and medium for using vector instructions to perform string comparisons. A single instruction compares the elements of two vectors and simultaneously checks for the null character. If an inequality or the null character is found, then the string comparison loop terminates, and a further check is performed to determine if the strings are equal. If all elements are equal and the null character is not found, then another iteration of the string comparison loop is executed. The vectors are loaded with the next portions of the strings, and then the next comparison is performed. The loop continues until either an inequality or the null character is found.

20 Claims, 7 Drawing Sheets

| | |
|---|---|
| 105 | TOP: |
| 110 | LOAD VECTOR A[i] |
| 115 | LOAD VECTOR B[i] |
| 120 | COMPARE VECTORS A, B |
| 125 | BRANCH ON ANY ELEMENT NOT EQUAL TO |
| 130 | COMPARE VECTOR A, 'NUL' |
| 135 | BRANCH ON ANY ELEMENT EQUAL TO |
| 140 | INCREMENT COUNTERS |
| 145 | BRANCH TO TOP |

*FIG. 1*
(Prior Art)

Code 100

| | |
|---|---|
| 205 | TOP: |
| 210 | LOAD VECTOR A[i] |
| 215 | LOAD VECTOR B[i] |
| 220 | COMPARE VECTORS A, B AND COMPARE VECTOR A, 'NUL' |
| 225 | INCREMENT COUNTERS |
| 230 | BRANCH TO TOP |

Code 200

*FIG. 2*

ACCELERATION OF STRING COMPARISONS USING VECTOR INSTRUCTIONS

BACKGROUND OF THE INVENTION

1. Field of the Invention

The present invention relates generally to string comparisons, and in particular to using vector instructions to perform string comparisons.

2. Description of the Related Art

String comparison operations are frequently performed in a variety of computer applications. A string may be defined as a stream or array of characters stored in a contiguous sequence. The characters of the string are often represented using one or two bytes. In many software environments, a null terminating character may serve as a reserved character to signify the end of string. Such a string may be referred to as a null-terminated string or "ASCIIZ" string. The null terminating character, sometimes represented as NUL or 'Ø' which may be a control character with a value of zero. NUL is present in many character sets.

Using single instruction multiple data (SIMD) processing, string comparison operations have been implemented to operate on vectors containing a plurality of characters. SIMD processing is an approach wherein a single instruction operates on a packed vector containing a plurality of elements. A SIMD or vector instruction specifies an instruction that will be repeated for an entire vector of independent data values, thereby essentially describing a large number of operations in a single instruction. Traditionally, a comparison of strings takes at least two operations, a first to compare the characters for equality and a second to check whether the strings contain the null terminating character. A prior art code example of a SIMD string comparison operation is shown in FIG. 1.

Code 100 begins by loading the first vector A[i] from a first string (instruction 110), loading the second vector B[i] from a second string (instruction 115), and then comparing vectors A and B (instruction 120). After the comparison, the next instruction (125) is to branch if any mismatches between corresponding elements of vectors A and B are found. Then, the next instruction (130) is to compare the elements of vector A to the null terminating character (NUL). If NUL is found in any of the elements of vector A, then the end of a string has been reached. Alternatively, the elements of vector B could be compared to NUL. After this comparison, the next instruction (135) will branch out of the loop if any of the elements of vector A is NUL. Next, the counters of the first and second strings may be incremented (instruction 140) in preparation for the next compare operation of the next section of the first and second strings. Then, the next instruction (145) will branch back to the top (105) of the loop.

As shown in FIG. 1, code 100 is an eight-instruction loop. Code 100 has three different branches, two branches (125 and 135) in the middle and one branch (145) at the bottom of the loop back to the top of the loop. Typically, one of the two branches (125 or 135) in the middle of the loop will be taken to exit from the loop. Consequently, execution of the loop is complex and inefficient since it is difficult to predict which of the branches will be taken.

Therefore, a need exists in the art for a less complex and more efficient string comparison operation. In view of the above, improved methods and mechanisms for performing string comparison operations are desired.

SUMMARY OF EMBODIMENTS OF THE INVENTION

Various embodiments of processors, methods, and mediums for executing vector instructions to perform string comparison operations are contemplated. In one embodiment, a loop of vector instructions may be executed to perform a string comparison operation of first and second strings. The loop may begin by loading a portion of a first string into a first vector register. Then, a portion of a second string may be loaded into a second vector register. The first and second vector registers may contain the same number of elements. Counters may be utilized to indicate which portions of the first and second strings should be loaded into the first and second vector registers, respectively.

After the first and second vector registers have been loaded, a vector instruction may be executed to perform two comparison operations simultaneously. The first comparison operation may compare each element of the first vector register to the corresponding element of the second vector register. The second comparison operation may compare each element of the first vector register to the null terminating character (NUL). Alternatively, the second comparison operation may compare each element of the second vector register to NUL. In one embodiment, the results of the comparison operations may be stored in a third vector. In another embodiment, the results of the comparison operations may be stored in a condition code register.

Next, the counters to the first and second strings may be incremented by the number of elements in the vector registers. After the counters have been incremented, a branch instruction may be executed to branch back to the beginning of the loop depending on the status of the results from the comparison operations. If an inequality or NUL is detected in the results, then the branch may fail and the loop may terminate. If no inequalities or NUL characters are detected in the results, then the branch may take execution back to the beginning of the loop. If the branch fails, additional code may execute to determine the cause of the failure and to determine if the two strings are equal.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 1 illustrates a prior art code example of a string comparison operation.

FIG. 2 illustrates a code example of a more efficient string comparison operation.

DETAILED DESCRIPTION

Figure 3A:
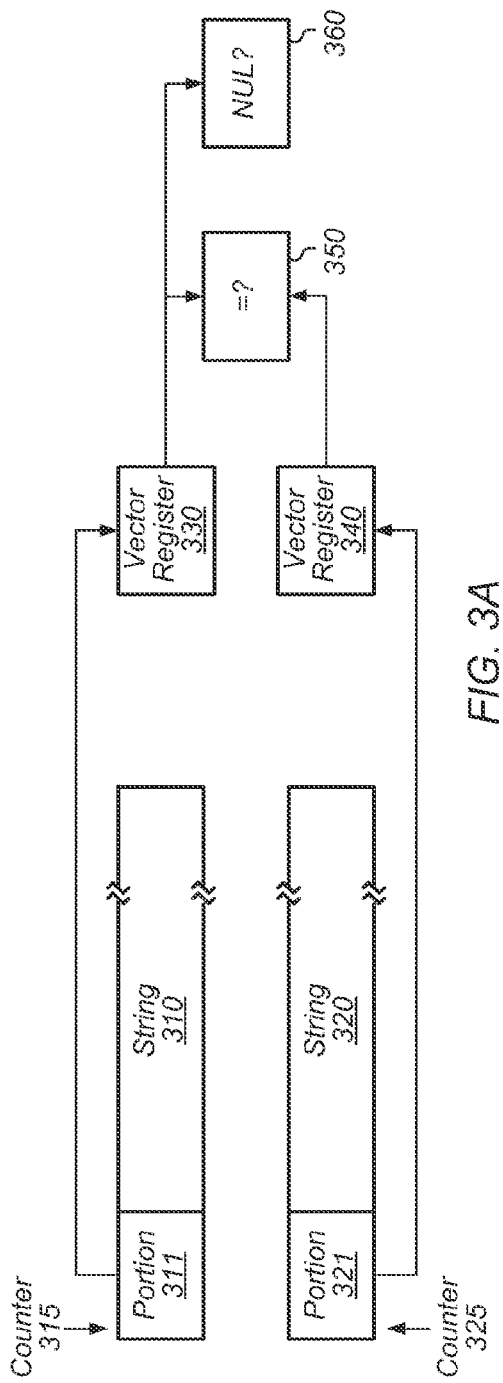
FIG. 3A illustrates a block diagram of a first step of a string comparison operation in accordance with one or more embodiments.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A processor comprising a vector unit . . . " Such a claim does not foreclose the processor from including additional components (e.g., an instruction fetch unit, a cache).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a processor having eight processing elements or cores, the terms "first" and "second" processing elements can be used to refer to any two of the eight processing elements. In other words, the "first" and "second" processing elements are not limited to logical processing elements 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Turning now to FIG. 2, an example code loop for performing string comparison operations in accordance with one embodiment is shown. Code 200 of FIG. 2 has five instructions, and code 200 may be executed by one or more vector units of a vector processor. Code 200 has three fewer instructions than the prior art code 100 of FIG. 1. Furthermore, code 200 has two fewer branches than code 100, which may offer a significant decrease in the complexity of code 200 as compared to code 100. The code loop 200 is a loop with a single branch (230) at the bottom of the loop that branches back to the top (205) of the loop.

The code loop 200 may begin by loading vector A[i] from a first string (instruction 210) and loading vector B[i] from a second string (instruction 215). Then, in instruction 220, corresponding elements of vectors A and B may be compared and each element of vector A may be compared to NUL. In some cases, an element of vector B may contain a NUL character, and vector A may not contain a NUL character. In these cases, comparing the elements of vector A to the NUL character will not find the end of the string, but comparing corresponding elements of vectors A and B will result in an inequality for the element with the NUL character in vector B, causing the branch instruction 230 to fall through. In another embodiment, instruction 220 may compare the elements of vector B to NUL instead of comparing the elements of vector A to NUL.

In various embodiments, instruction 220 may include placing values in a plurality of elements of an output vector to indicate and store the results of the comparisons. The output vector may be the same size (i.e., contain the same number of elements) as vectors A and B. In one embodiment, instruction 220 may place a '0' in an element of the output vector if the corresponding elements of vectors A and B are equal and if the corresponding element in vector A is not NUL. Instruction 220 may place a '1' in an element of the output vector if an inequality is found between the corresponding elements of vectors A and B or if NUL is found in the corresponding element of vector A. Therefore, in this embodiment, the branch instruction 230 may fall through if there is a '1' in any element of the output vector. Otherwise, if all elements of the output vector are '0', then the branch instruction 230 may return to the top (205) of the loop.

In another embodiment, the comparison instruction 220 may place a '1' in an element of the output vector if there is a malfunction, a '2' in the element when the corresponding elements of vectors A and B are unequal, or a '3' in the element when NUL has been found in the corresponding element of vector A. If an element of vector A is NUL and element B is not NUL, then the element may be considered an inequality and NUL. In that case, a '2' may be stored in the corresponding element of the output vector. After comparison instruction 220 has been executed and the result values have been placed in the output vector, and if branch instruction 230 falls through, then branch instruction 230 may take execution of the code to different sections of further code based on the values stored in the output vector. For example, if a '2' is found in any elements of the output vector, then the code may jump to further code for handling inequalities. If a '3' is found in any elements of the output vector, then the code may jump to further code for handling end of string situations. If both a '2' and a '3' are found in the output vector, then the leftmost occurrence of the '2' or '3' may take precedence when determining which further section of code to execute. Other variations of schemes for assigning values to different result conditions are possible and are contemplated.

After instruction 220, the counters may be incremented in instruction 225. In one embodiment, there may be one counter per string, such that each string has its own counter. In various embodiments, the counters may be referred to as indices or pointers. In another embodiment, there may be a single index for both strings, wherein the index locates the leftmost not-yet-compared position in the first and second string arrays. In other embodiments, other methodologies and mechanisms for tracking the locations of elements within strings that are next in line for a comparison operation are possible and are contemplated.

Prior to execution of instruction 225, the counters may point to the portions of the first and second strings that were loaded into vector A and vector B for the most recent comparison instruction 220. For example, the string A may be stored in an array A(i), and the counter for string A may be incremented in instruction 225 for the next pass through loop 200. The counter may be incremented to point to "i+L", wherein 'L' is the length of the vector, and wherein 'i' was the previous value of the counter. The counter for string B may be incremented in a similar manner as part of instruction 225.

Following execution of instruction 225, the branch to top instruction 230 may be executed. In one embodiment, the branch to top instruction 230 will fail if either an inequality or NUL was found during compare instruction 220. When the branch to the top of the loop fails, then the execution of code loop 200 may be terminated, and then additional code may be executed that determines why loop 200 terminated.

In some cases, an output vector may contain both a value for an inequality and a value for the NUL character, indicating that the comparison found an inequality and a NUL character. The additional code, which may be executed after the loop 200 has been terminated, may determine which value (inequality or NUL) came first if both values are in the output vector. There may be an inequality in an element before (i.e., to the left of) the element with the NUL character, or there may be an inequality in an element after (i.e., to the right of) the element with the NUL character. If there is an inequality before the NUL character, then the two strings are not equal. If there is an inequality after the NUL character, then the two strings may be equal. There may be random bits of memory in the vectors following the NUL character, and so an inequality after the NUL character may be ignored.

When a failure at branch instruction 230 terminates loop 200, then the processor may start executing a different section of additional code. The additional code may determine the cause of the termination of the loop. For example, the loop may have been terminated due to an inequality between the elements of vectors A and B or due to NUL being found. The additional code may also need to determine which condition occurred first if both conditions (inequality and NUL) occurred in the final iteration that caused loop 200 to terminate. For example, the last compare instruction 220 before loop 200 was terminated may have found an inequality and NUL. If the inequality occurred after (i.e., to the right of) the NUL, then the NUL may take precedence. If the inequality occurred before (i.e., to the left of) the NUL, then the inequality may take precedence. It is noted that these classifications may be reversed, such that the string comparison may be reading from right to left instead of from left to right, and therefore the first occurrence of a condition (inequality or NUL) on the right-side of the strings may determine which condition takes precedence. In either case, the leftmost or rightmost occurrence of the first inequality or NUL indicator may be registered and may take precedence in determining the cause of branch instruction 230 exiting loop 200.

In other embodiments, instead of writing the results of the comparison instruction 220 to an output vector, a condition code in a condition code register may be set based on the comparison. In one embodiment, if instruction 220 determines that all corresponding elements of the vectors A and B are equal and the NUL character was not found in vector A, then the condition code may be set to '−1'. If instruction 220 finds an inequality or the NUL character, then the condition code may be set to '0'. Then, the branch instruction 230 may return to the top (205) of code loop 200 if the condition code is less than zero. As soon as the condition code is equal to zero, then branch instruction 230 may fail and the next section of code may be executed.

Turning now to FIG. 3A, a block diagram of one embodiment of a string comparison operation is shown. Each of strings 310 and 320 may contain any number of characters. Typically, strings 310 and 320 will be longer (i.e., contain more characters) than the dimension size of vector registers 330 and 340. However, in some cases, strings 310 and 320 may be shorter than or the same size as vector registers 330 and 340. The comparison of strings 310 and 320 may begin with a comparison of the first portion of string 310 with the first portion of string 320. The size of the portion may be determined by the size of the vector registers within a vector processing unit. For example, in one embodiment, the vector register and portion size may be eight elements, wherein each element stores a single character. In other embodiments, other sizes of vector registers and portions may be utilized.

Counter 315 may point to the current location of string 310 that will be loaded into vector register 330 for the first vector comparison, and counter 325 may point to the current location of string 320 that will be loaded into vector register 340 for the first vector comparison. In another embodiment, counters 315 and 325 may be implemented as pointers or indices. The first portion of string 310 may be loaded to vector register 330, and the first portion of string 320 may be loaded to vector register 340.

Then, after vector registers 330 and 340 have been loaded, vector registers 330 and 340 may be compared, as indicated by comparison block 350. Comparison block 350 may include comparing each element of vector register 330 to the corresponding element of vector register 340. At the same time, a second comparison may be performed, as indicated by block 360, wherein each element of vector register 330 is compared to the null terminating character (NUL). Alternatively, each element of vector register 340 may be compared to NUL. Comparison 350 and comparison 360 may be performed simultaneously (i.e., in the same clock cycle) by one or more vector units (not shown) of a vector processor (not shown). In one embodiment, the results of comparisons 350 and 360 may be written to a third vector. In another embodiment, various values may be written to the condition code register based on the results of comparisons 350 and 360. In a further embodiment, the results of comparisons 350 and 360 may be utilized in a different manner and/or stored in another memory location.

After comparisons 350 and 360 have been completed, counters 315 and 325 may be incremented. Then, a determination may be made if the string comparison should proceed to the next portions of strings 310 and 320. This determination may be based on the results of comparisons 350 and 360. In one embodiment, if all corresponding elements between vector registers 330 and 340 are equal and the NUL character is not found, then the comparison of strings 310 and 320 may be continued.

Figure 3B:
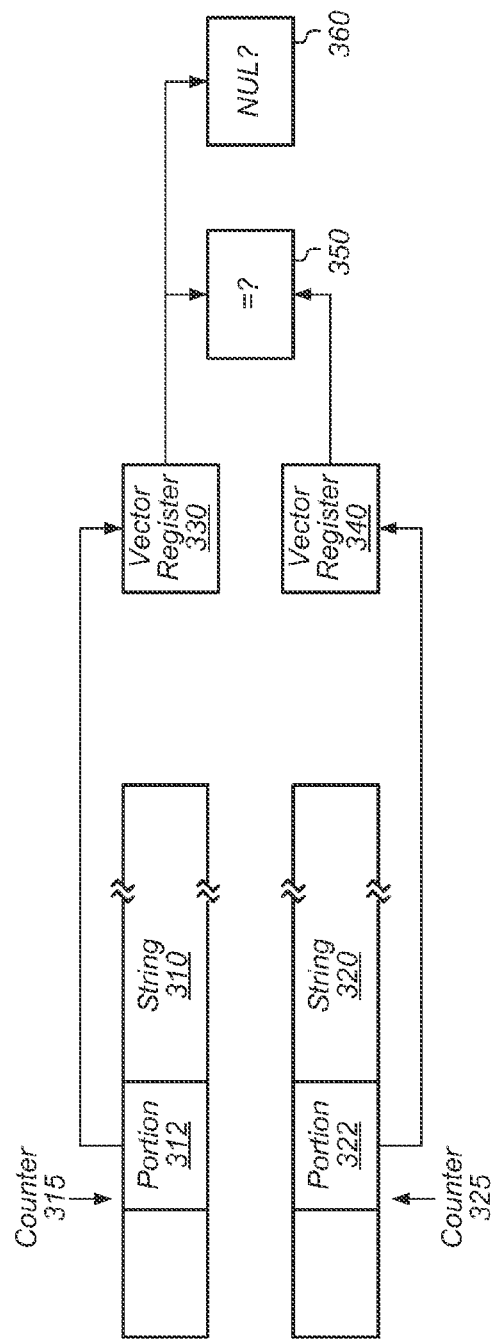
FIG. 3B illustrates a block diagram of a second step of a string comparison operation in accordance with one or more embodiments.

If it is determined that the comparison of strings 310 and 320 should be continued, then the next portions (312 and 322) of strings 310 and 320 may be loaded into vector registers 330 and 340. As shown in FIG. 3B, portion 312 of string 310 may be loaded into vector register 330 and portion 322 of string 320 may be loaded into vector register 340. Then, comparisons 350 and 360 may be performed. These steps may continue for a plurality of iterations until it is determined that the loop should stop based on the results of comparisons 350 and 360. For example, in one embodiment, strings 310 and 320 may be identical and each string may contain 800 elements (including the NUL character). If the vector size is 8 elements, then portions of strings 310 and 320 may be loaded into vector registers 330 and 340 for 100 iterations of the dual-comparison instruction.

In other embodiments, other comparisons may be utilized besides the equal comparison of block 350. For example, the string operation may be searching for the occurrence of a particular character in the string, and block 350 may determine if the input character is not equal to the particular character. In various embodiments, block 350 may implement a greater than or less than comparison for other types of string comparisons. Other types of comparisons are possible and are contemplated.

Figure 4:
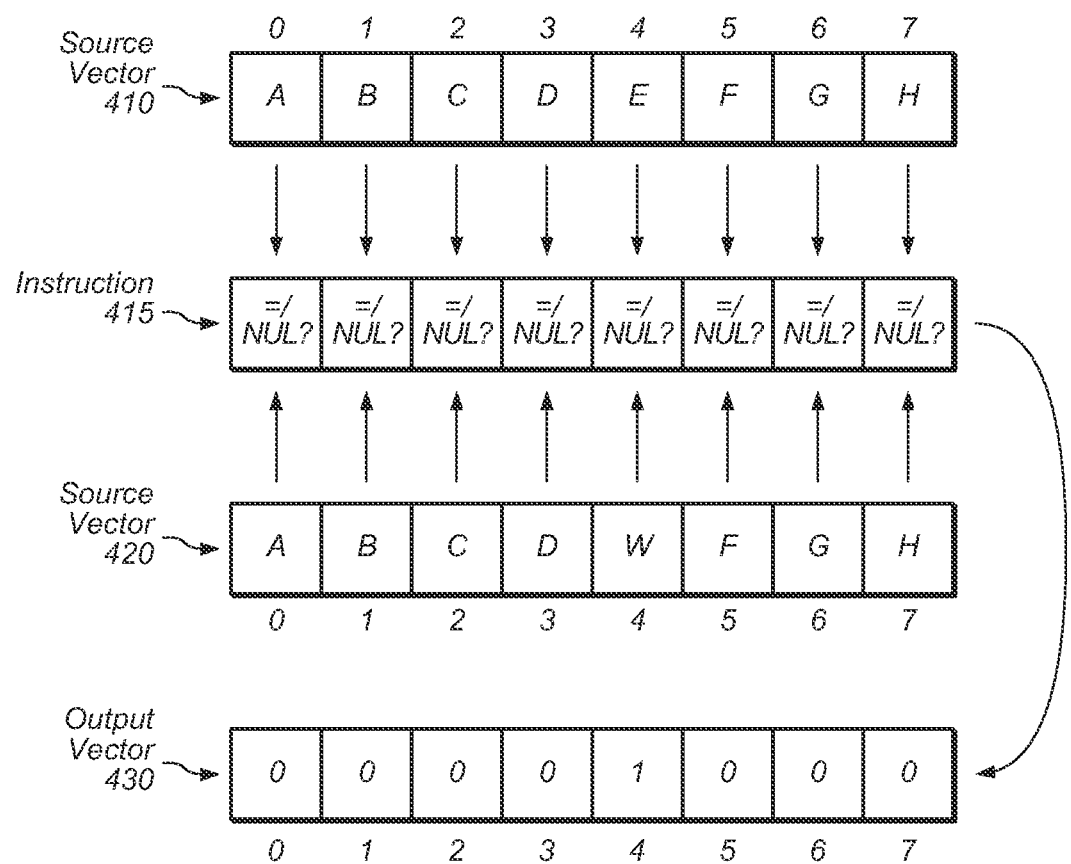
FIG. 4 illustrates a block diagram of a vector dual-comparison instruction in accordance with one or more embodiments.

Referring now to FIG. 4, a block diagram illustrating one embodiment of a vector dual-comparison instruction is shown. Source vector 410 may be loaded with a portion of a first string and source vector 420 may be loaded with a portion of a second string. Source vectors 410 and 420 each contain eight elements as shown in FIG. 4, and each element may store a single character. It is noted that vectors 410 and 420 may contain other numbers and sizes of elements in other embodiments. For example, vectors 410 and 420 may contain 4, 16, 32, or any other suitable number of elements in other embodiments, and the element size may be any number of bits or characters. In various embodiments, source vectors 410 and 420 may be stored in vector registers.

As shown in FIG. 4, vectors 410 and 420 may be compared by executing instruction 415. Instruction 415 may include two separate comparisons. The first comparison may compare each element of vector 410 to the corresponding element of vector 420. For example, element 0 of vector 410 may be compared to element 0 of vector 420, element 1 of vector 410 may be compared to element 1 of vector 420, and so on. The second comparison may compare each element of vector 410 to the NUL character. In another embodiment, each element of vector 420 may be compared to the NUL character. The results of each of these element-by-element comparisons and the NUL checking may be stored in the elements of output vector 430. In various embodiments, vector 430 may contain the same number of elements as vectors 410 and 420.

In one embodiment, if corresponding elements of vectors 410 and 420 are equal, and the element of vector 410 is not the NUL character, then a '0' value may be stored in the corresponding element of vector 430. If the element of vector 410 is not equal to the corresponding element of vector 420, or if the element of vector 410 is the NUL character, then a '1' value may be stored in the corresponding element of vector 430. In another embodiment, these values may be reversed, such that a '0' value indicates an inequality or the NUL character and a '1' value indicates the elements are equal and the element of vector 410 is not the NUL character. In other embodiments, other values may be used to indicate the various results of the comparison and NUL checking instruction 415. In further embodiments, a condition code register may be utilized to store the results of instruction 415.

Figure 5:
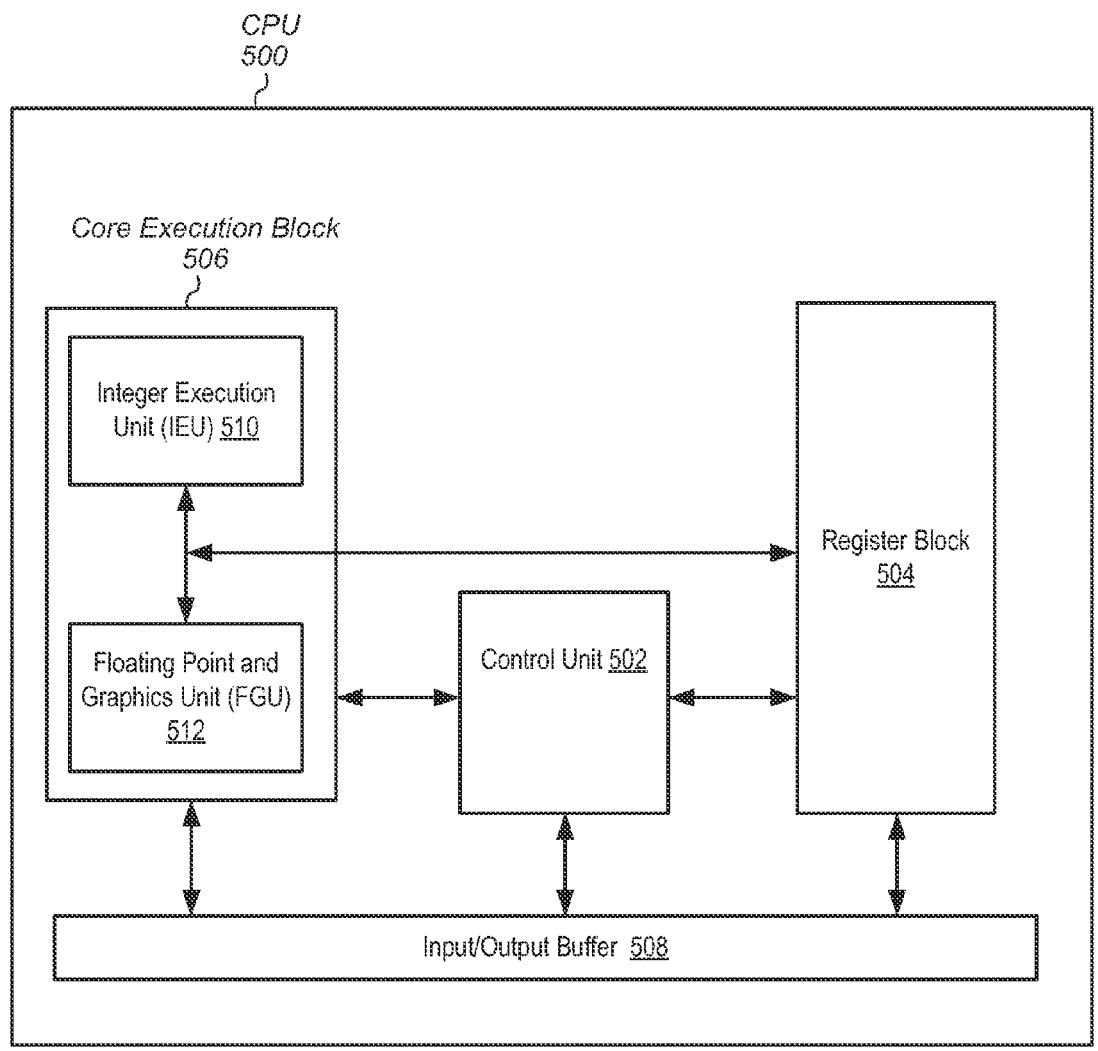
FIG. 5 is a block diagram illustrating one embodiment of a central processing unit.

Referring now to FIG. 5, a block diagram illustrating one embodiment of a central processing unit (CPU) is shown. CPU 500 includes a control unit 502 connected to a register block 504, a core execution block 506, and an input/output buffer 508. The input/output buffer 508 is responsible for fetching instructions and data from main memory or cache and passing them to control unit 502. The input/output buffer 508 also sends information from the CPU 500 to other parts of the processor and handles cache management and mapping.

The control unit 502 controls instruction execution and the movement of data within CPU 500. Instruction execution may be carried out using a pipelined schedule, wherein at any one time several instructions may be at various stages of execution within CPU 500. The control unit 502 manages the instruction pipeline by, for example, decoding instructions, checking for dependencies between instructions in the pipeline, allocating and scheduling CPU resources, and carrying out instruction renaming. Instruction renaming may involve generating helper instructions for more complex instructions.

In addition to managing the instruction pipeline, control unit 502 maintains the correct architectural state of CPU 500. Maintaining the CPU state generally involves updating special control and status registers within the register block 504. For example, the control unit 502 may maintain a program counter register used to locate the next program instruction to be executed. In addition, the control unit 502 may feature a branch prediction mechanism, wherein historical analysis of past branch results are used to predict future branch results, thereby improving the pipeline efficiency.

Register block 504 is essentially a specialized group of memory locations which are read and written by core execution block 506 and input/output buffer 508. Typically, registers may be designated as either general purpose registers or control and status registers. General purpose registers hold data and address information and may be manipulated by the instructions running in CPU 500. General purpose registers may be further categorized as either integer registers or floating-point registers. Often, the integer registers are only visible to the integer execution unit (IEU) 510 and the floating-point registers are only visible to the floating point and graphics unit (FGU) 512. Status and control registers contain condition and control codes relating to the processor's operation. Although some status and control registers can be modified by program instructions, many registers may be configured as read only.

The core execution block 506 carries out processor computations and data manipulation. Although there are many variations of core execution block design configurations which may be used with the mechanisms and methods presented herein, core execution block 506 shown in FIG. 5 is divided into an integer execution unit (IEU) 510 and a floating point and graphics unit (FGU) 512.

IEU 510 may be responsible for integer-based arithmetic and logical computations in CPU 500. Arithmetic computations may include virtual address calculations as well as data calculations. Typically, IEU 510 may receive a partially decoded integer instruction from control unit 502. IEU 510 may conduct a final decode of the instruction and then may execute the instruction. FGU 512 may perform floating-point, graphics, and vector instructions. FGU 512 may receive partially decoded instructions from control unit 502, complete the instruction decode, and perform vector operations as required by the current instruction.

Figure 6:
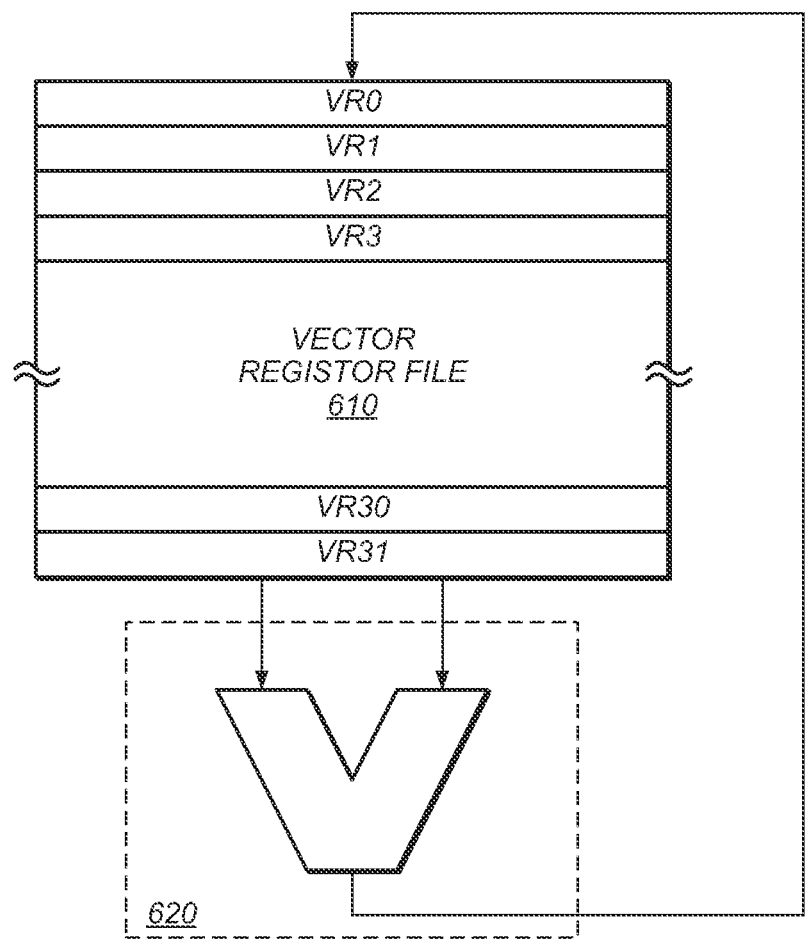
FIG. 6 is a block diagram illustrating one embodiment of a vector unit coupled to a vector register file.

Turning now to FIG. 6, a block diagram illustrating one embodiment of a vector unit coupled to a vector register file is shown. Vector register file 610 includes a set of 32 registers VR0, VR1, . . . VR31, and the size of the registers may depend on the size of vector unit 620. In other embodiments, vector register file 610 may include other numbers of registers, such as 64, 128, or any other suitable number. In various embodiments, the size of the registers may be 64 bits, 128 bits, or any other suitable number of bits. Each register in vector register file 610 may store a plurality of data elements. For example, if the size of a vector register is 64 bits, then a vector register may store 4 16-bit elements, 8 8-bit elements, or other such combinations. In one embodiment, vector register file 610 may include vector registers 330 and 340 (of FIG. 3).

Vector unit 620 may include one or more computing units capable of operating on source vectors read from vector register file 610. In one embodiment, vector unit 620 may be included in a floating point and graphics unit, such as floating point and graphics unit 512 (of FIG. 5). Vector unit 620 may generate a result vector for each vector instruction, and the result vector may be written to a register in vector register file 610. In various embodiments, vector unit 620 may operate on two source vectors supplied by vector register file 610. In one embodiment, vector unit 620 may execute one or more of the instructions of code 200 (of FIG. 2).

Figure 7:
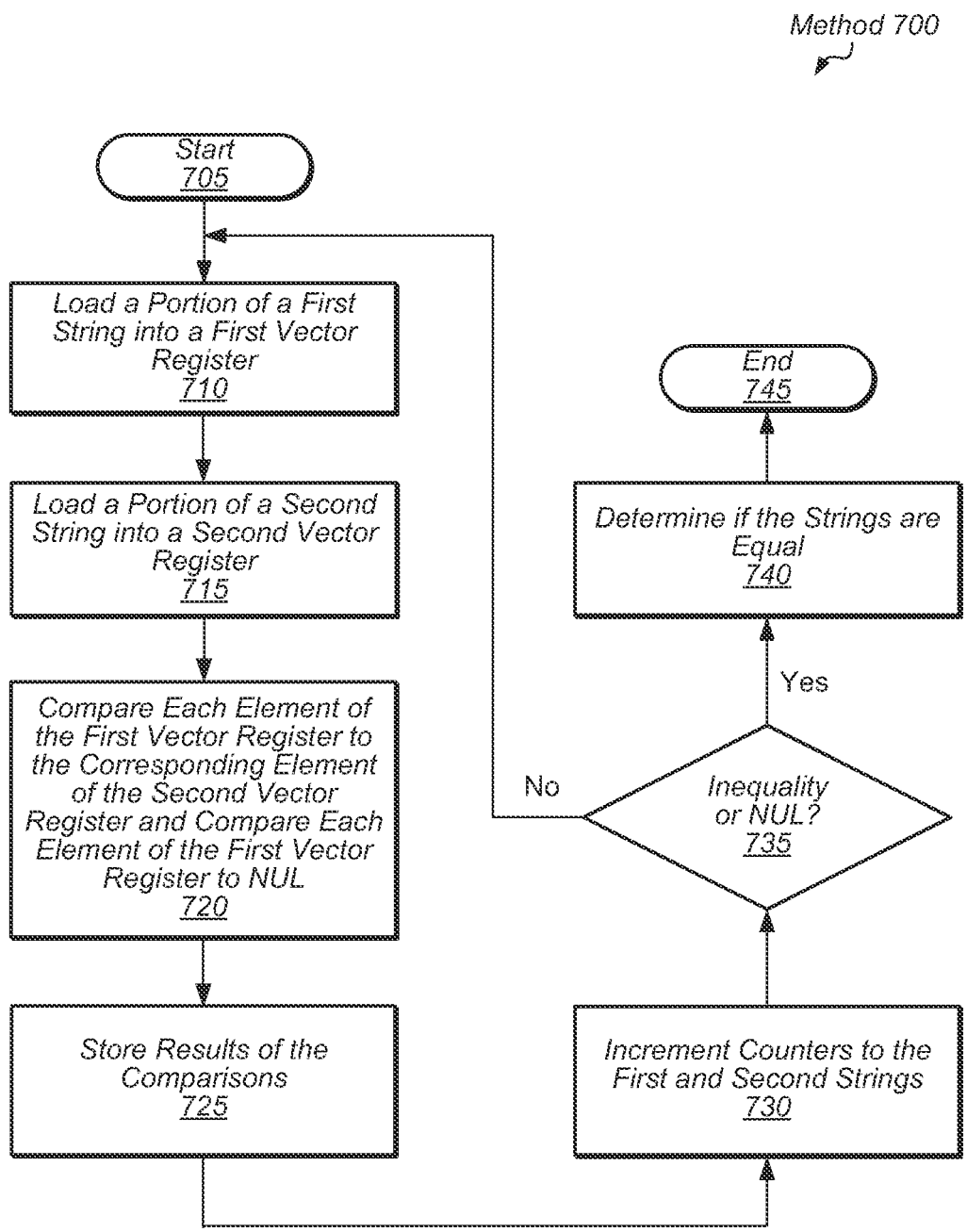
FIG. 7 is a generalized flow diagram illustrating one embodiment of a method for performing a string comparison operation.

Turning now to FIG. 7, one embodiment of a method for performing a string comparison operation is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

Method 700 starts in block 705, and then a portion of a first string may be loaded into a first vector register (block 710). The first vector register may contain a plurality of N elements, wherein N is an integer. In various embodiments, N is an integer greater than one. For example, in one embodiment, the first vector register may contain eight elements and each element may store a single character from the first string. Next, a portion of a second string may be loaded into a second vector register (block 715). The second vector register may be the same size as the first vector register. In various embodiments, a first counter may point to the portion of the first string that is loaded into the first vector register, and a second counter may point to the portion of the second string that is loaded into the second vector register. The first and second counters may be utilized to determine which portions of the first and second strings to load into the first and second vector registers, respectively.

After block 715, each element of the first vector register may be compared to the corresponding element of the second vector register and each element of the first vector register may be compared to NUL (block 720). These two comparison operations may be performed simultaneously by one or more vector units. Next, the results of the two comparison operations may be stored (block 725). In one embodiment, the results may be stored in a third vector register. In another embodiment, the results may be stored in a condition code register.

After block 725, the counters to the first and second strings may be incremented (block 730). The counters may be incremented by the size (i.e., number of elements) of the vector registers. Next, it may be determined from the results if an inequality or NUL was found in the two comparison operations (conditional block 735). If the results indicate no inequalities or NUL characters were found (conditional block 735), then method 700 may branch back to block 710 and load the next portion of the first string into the first vector register.

If an inequality or NUL character was found (conditional block 735), then a next section of instructions may be executed to determine if the strings are equal (block 740). The strings may be equal if the NUL character was found and no inequalities were found. The strings may also be equal if inequalities were found but they occurred after the NUL character. After block 740, method 700 may end in block 745.

Figure 8:
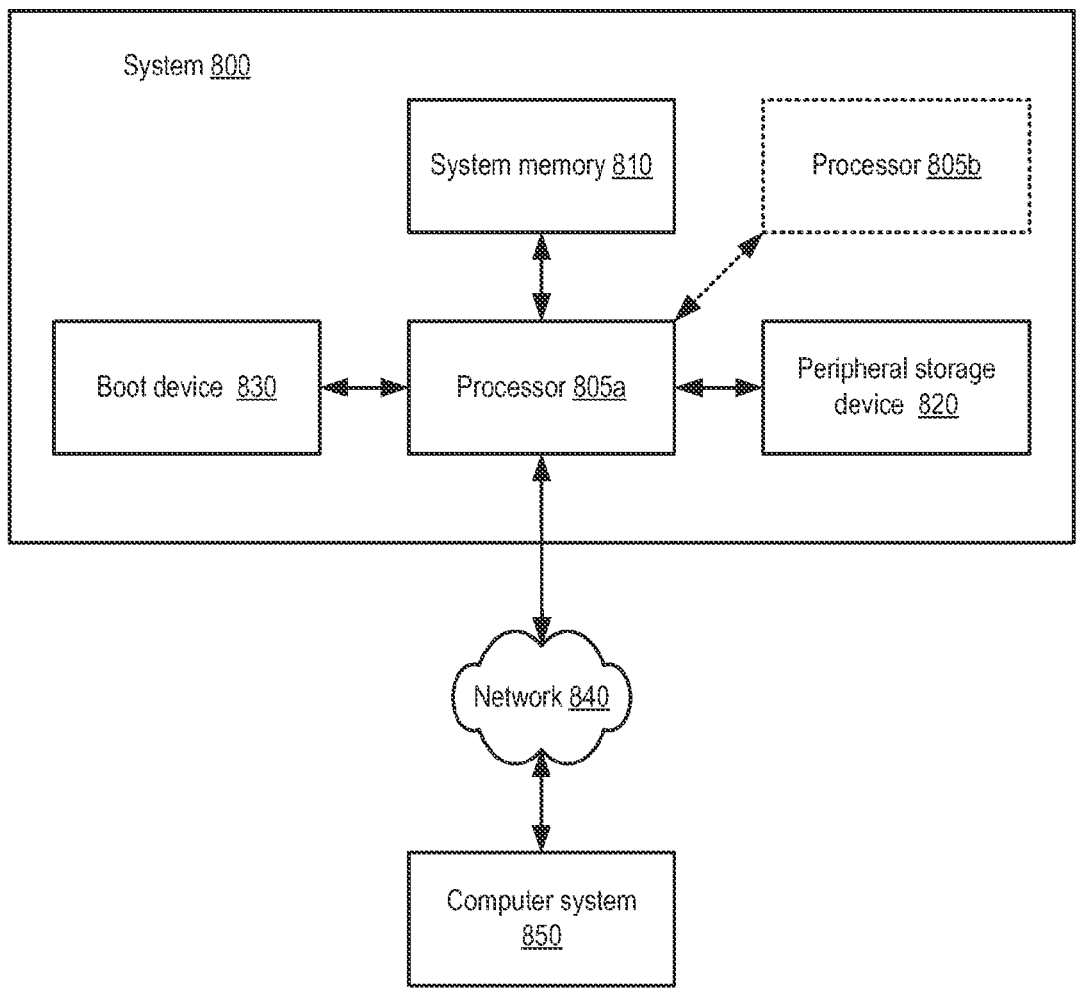
FIG. 8 is a block diagram illustrating one embodiment of a system including a processor.

Referring now to FIG. 8, a block diagram of one embodiment of a system including a processor is shown. In the illustrated embodiment, system 800 includes an instance of processor 805, shown as processor 805a, that is coupled to a system memory 810, a peripheral storage device 820, and a boot device 830. System 800 is coupled to a network 840, which is in turn coupled to another computer system 850. In some embodiments, system 800 may include more than one instance of the devices shown. In various embodiments, system 800 may be configured as a rack-mountable server system, a standalone system, or in any other suitable form factor. In some embodiments, system 800 may be configured as a client system rather than a server system.

System 800 may be incorporated into many different types of electronic devices. For example, system 800 may be part of a desktop computer, a laptop computer, a server, a media player, an appliance, a cellular phone, testing equipment, a network appliance, a calculator, a personal digital assistant (PDA), a smart phone, a guidance system, a control system (e.g., an automotive control system), or another electronic device.

In some embodiments, system 800 may be configured as a multiprocessor system, in which processor 805a may optionally be coupled to one or more other instances of processor 805, shown in FIG. 8 as processor 805b. For example, processors 805a-b may be coupled to communicate via their respective coherent processor interfaces.

In various embodiments, system memory 810 may comprise any suitable type of system memory as described above, such as FB-DIMM, DDR/DDR2/DDR3/DDR4 SDRAM, or RDRAM®, for example. System memory 810 may include multiple discrete banks of memory controlled by discrete memory interfaces in embodiments of processor 805 that provide multiple memory interfaces. Also, in some embodiments, system memory 810 may include multiple different types of memory.

Peripheral storage device 820, in various embodiments, may include support for magnetic, optical, or solid-state storage media such as hard drives, optical disks, nonvolatile RAM devices, etc. In some embodiments, peripheral storage device 820 may include more complex storage devices such as disk arrays or storage area networks (SANs), which may be coupled to processor 805 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 805, such as multimedia devices, graphics/display devices, standard input/output devices, etc.

In one embodiment, boot device 830 may include a device such as an FPGA or ASIC configured to coordinate initialization and boot of processor 805, such as from a power-on reset state. Additionally, in some embodiments boot device 830 may include a secondary computer system configured to allow access to administrative functions such as debug or test modes of processor 805.

Network 840 may include any suitable devices, media and/or protocol for interconnecting computer systems, such as wired or wireless Ethernet, for example. In various embodiments, network 840 may include local area networks (LANs), wide area networks (WANs), telecommunication networks, or other suitable types of networks. In some embodiments, computer system 850 may be similar to or identical in configuration to illustrated system 800, whereas in other embodiments, computer system 850 may be configured in a substantially different manner. For example, computer system 850 may be a server system, a processor-based client system, a stateless "thin" client system, a mobile device, etc.

It is noted that the above-described embodiments may comprise software. In such an embodiment, program instructions and/or a database (both of which may be referred to as "instructions") that represent the described systems and/or methods may be stored on a computer readable storage medium. Generally speaking, a computer readable storage medium may include any non-transitory storage media accessible by a computer during use to provide instructions and/or data to the computer. For example, a computer readable storage medium may include non-transitory storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, non-volatile memory (e.g. Flash memory) accessible via a peripheral interface such as the USB interface, etc. Storage media may include micro-electro-mechanical systems (MEMS), as well as storage media accessible via a communication medium such as a network and/or a wireless link.

Although several embodiments of approaches have been shown and described, it will be apparent to those of ordinary skill in the art that a number of changes, modifications, or alterations to the approaches as described may be made. Changes, modifications, and alterations should therefore be seen as within the scope of the methods and mechanisms described herein. It should also be emphasized that the above-described embodiments are only non-limiting examples of implementations.

What is claimed is:

1. A method comprising:
loading a portion of a first string into a first vector register and loading a portion of a second string into a second vector register, wherein each of the first and second vector registers comprises a plurality of N elements, wherein N is an integer;
performing two comparison operations simultaneously, wherein a first comparison operation compares each element of the first vector register to a corresponding element of the second vector register, and wherein a second comparison operation compares each element of the first vector register to a null terminating character;
storing results of said first and second comparison operations in a third vector register; and
responsive to said results indicating no inequalities or null terminating characters were found, repeating said loading, performing, and storing steps.

2. The method as recited in claim 1, wherein storing results of said first and second comparison operations in a third vector register comprises:
responsive to finding an inequality as a result of said first comparison operation, storing a first indicator in a corresponding element of the third vector register;
responsive to finding the null terminating character as a result of said second comparison operation, storing a second indicator in a corresponding element of the third vector register; and
responsive to finding neither an inequality as a result of said first comparison nor a null terminating character as a result of said second comparison, storing a third indicator in a corresponding element of the third vector register.

3. The method as recited in claim 1, wherein the third vector register contains both a value for an inequality and a value for the null terminating character.

4. The method as recited in claim 1, wherein a first counter indicates which portion of the first string to load into the first vector register, wherein a second counter indicates which portion of the second string to load into the second vector register, and wherein the method further comprising incrementing the first and second counters by N prior to repeating said loading, performing, and storing steps.

5. The method as recited in claim 1, responsive to said results indicating an inequality or a null terminating character was found, the method further comprising branching to another set of instructions.

6. The method as recited in claim 1, responsive to said results indicating an inequality and a null terminating character were found, the method further comprising assigning priority to a leftmost occurrence of the inequality or the null terminating character.

7. The method as recited in claim 1, wherein each of the first and second strings are terminated with a null terminating character.

8. A processor comprising:
a vector unit; and
a vector register file, wherein the vector register file comprises a plurality of vector registers, and wherein the vector register file is coupled to the vector unit;
wherein the vector unit comprises circuitry configured to:
load a portion of a first string into a first vector register and load a portion of a second string into a second vector register, wherein each of the first and second vector registers comprises a plurality of N elements, wherein N is an integer;
perform two comparison operations simultaneously, wherein a first comparison operation compares each element of the first vector register to a corresponding element of the second vector register, and wherein a second comparison operation compares each element of the first vector register to a null terminating character;
store results of said first and second comparison operations in a third vector register; and
responsive to said results indicating no inequalities or null terminating characters were found, repeat said loading, performing, and storing steps.

9. The processor as recited in claim 8, wherein storing results of said first and second comparison operations in a third vector register comprises:
responsive to finding an inequality as a result of said first comparison operation, storing a first indicator in a corresponding element of the third vector register;
responsive to finding the null terminating character as a result of said second comparison operation, storing a second indicator in a corresponding element of the third vector register; and
responsive to finding neither an inequality as a result of said first comparison nor a null terminating character as a result of said second comparison, storing a third indicator in a corresponding element of the third vector register.

10. The processor as recited in claim 8, wherein the third vector register contains both a value for an inequality and a value for the null terminating character.

11. The processor as recited in claim 8, wherein a first counter indicates which portion of the first string to load into the first vector register, wherein a second counter indicates which portion of the second string to load into the second vector register, and wherein the vector unit is further configured to increment the first and second counters by N prior to repeating said loading, performing, and storing steps.

12. The processor as recited in claim 8, responsive to said results indicating an inequality or a null terminating character was found, the vector unit is further configured to branch to another set of instructions.

13. The processor as recited in claim 8, responsive to said results indicating an inequality and a null terminating character were found, the vector unit is further configured to assign priority to a leftmost occurrence of the inequality or the null terminating character.

14. The processor as recited in claim 8, wherein each of the first and second strings are terminated with a null terminating character.

15. A non-transitory computer readable storage medium comprising program instructions, wherein when executed the program instructions are operable to:
    load a portion of a first string into a first vector register and load a portion of a second string into a second vector register, wherein each of the first and second vector registers comprises a plurality of N elements, wherein N is an integer;
    perform two comparison operations simultaneously, wherein a first comparison operation compares each element of the first vector register to a corresponding element of the second vector register, and wherein a second comparison operation compares each element of the first vector register to a null terminating character;
    store results of said first and second comparison operations in a third vector register; and
    responsive to said results indicating no inequalities or null terminating characters were found, repeat said loading, performing, and storing steps.

16. The non-transitory computer readable storage medium as recited in claim 15, wherein storing results of said first and second comparison operations in a third vector register comprises:
    responsive to finding an inequality as a result of said first comparison operation, storing a first indicator in a corresponding element of the third vector register;
    responsive to finding the null terminating character as a result of said second comparison operation, storing a second indicator in a corresponding element of the third vector register; and
    responsive to finding neither an inequality as a result of said first comparison nor a null terminating character as a result of said second comparison, storing a third indicator in a corresponding element of the third vector register.

17. The non-transitory computer readable storage medium as recited in claim 15, wherein the third vector register contains both a value for an inequality and a value for the null terminating character.

18. The non-transitory computer readable storage medium as recited in claim 15, wherein a first counter indicates which portion of the first string to load into the first vector register, wherein a second counter indicates which portion of the second string to load into the second vector register, and wherein when executed the program instructions are further operable to increment the first and second counters by N prior to repeating said loading, performing, and storing steps.

19. The non-transitory computer readable storage medium as recited in claim 15, responsive to said results indicating an inequality or a null terminating character was found, the program instructions are further operable to branch to another set of instructions.

20. The non-transitory computer readable storage medium as recited in claim 15, responsive to said results indicating an inequality and a null terminating character were found, the program instructions are further operable to assign priority to a leftmost occurrence of the inequality or the null terminating character.

* * * * *

UNITED STATES PATENT AND TRADEMARK OFFICE
CERTIFICATE OF CORRECTION

PATENT NO.        : 9,009,447 B2                                Page 1 of 1
APPLICATION NO.   : 13/185244
DATED             : April 14, 2015
INVENTOR(S)       : Gove It is certified that error appears in the above-identified patent and that said Letters Patent is hereby corrected as shown below:

In drawings,

Drawing sheet 5 of 7, figure 6, delete "REGISTOR" and insert -- REGISTER --, therefor.

Signed and Sealed this
Sixteenth Day of February, 2016

Michelle K. Lee
*Director of the United States Patent and Trademark Office*